G. L. TULLY.
TRIAL FRAME.
APPLICATION FILED MAY 24, 1912.
1,073,879.
Patented Sept. 23, 1913.
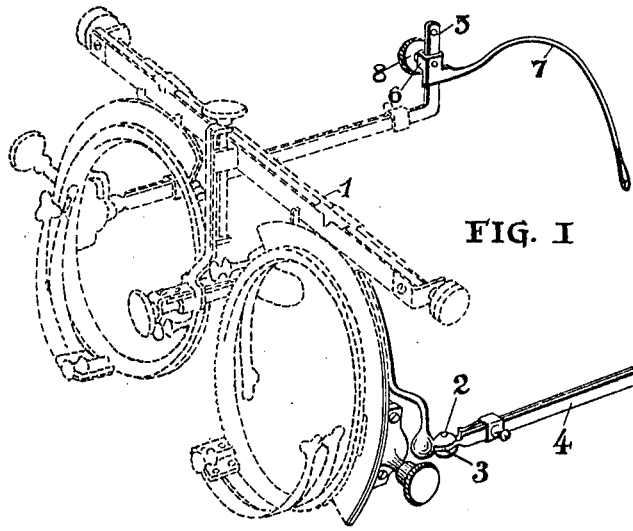
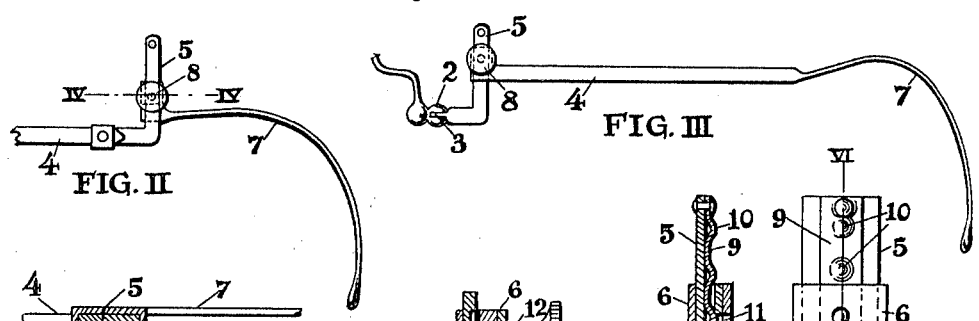
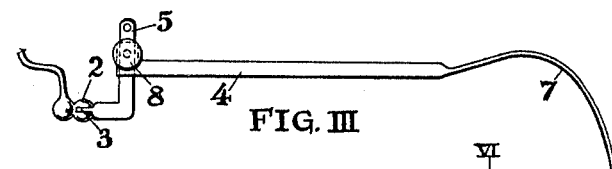
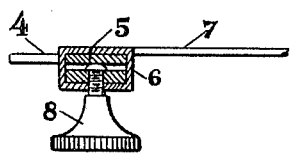
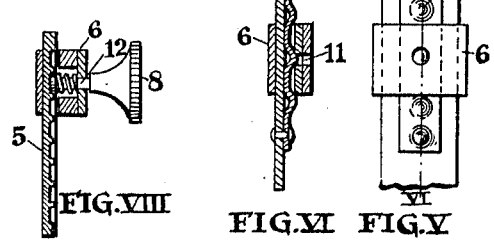
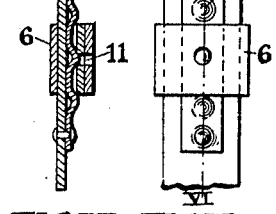
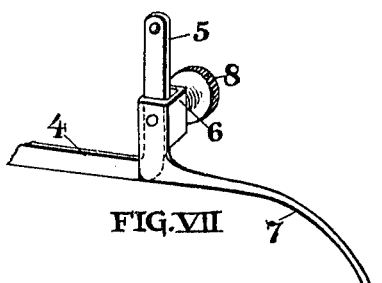
WITNESSES:
Joseph J. Demers
Reginald H. Waters
INVENTOR
GEORGE L. TULLY
By
H. H. Styles & H. K. Parsons
ATTORNEYS

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

TRIAL-FRAME.

1,073,879.  Specification of Letters Patent.  Patented Sept. 23, 1913.

Application filed May 24, 1912. Serial No. 699,494.

*To all whom it may concern:*

Be it known that I, GEORGE L. TULLY, a citizen of the United States, residing at Southbridge, in the county of Worcester and State of Massachusetts, have invented certain new and useful Improvements in Trial-Frames, of which the following is a specification.

My invention relates to improvements in trial frames, spectacles and the like, and has for its principal object the provision of an improved form of adjustable temple for use upon trial frames.

The further object of my invention is the provision of a temple particularly adapted for use upon trial frames which will be so constructed as to permit of adjustment of the temple relative to the remainder of the frame to suit the requirements of the individual wearer.

Other objects and advantages of my invention should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a view of a trial frame with my improved temples applied thereto. Fig. II represents a detail view of one form of my temple. Fig. III represents a detail view of a different form thereof. Fig. IV represents a sectional view on the line IV—IV of Fig. II. Fig. V represents an enlarged detail view illustrating a modified construction for locking the adjustable portion of my temple in desired position. Fig. VI represents a sectional view on the line VI—VI of Fig. V. Fig. VII represents a perspective view of the rear portion of my temple, and Fig. VIII represents a view of a slightly different means for securing the parts in adjusted position.

In the drawings, in which similar characters of reference are employed to denote corresponding parts throughout the several views, the numeral 1 designates the main portion of the trial frame having at each end an end piece 2 to which is pivoted the end 3 of the temple section 4, said temple member being composed of one or more parts as desired, in certain of the views I having illustrated an ordinary construction of trial frame temple which may be adjusted to vary the length thereof, said temple terminating in the arm 5 which preferably projects upward substantially at right angles to the main portion of the temple.

Slidably mounted upon the arm 5 is a sleeve 6 bearing the ear hook 7. In the majority of views I have shown the arm 4 as disposed at the rear end of the temple. In Fig. III, however, I have shown this arm as disposed adjacent the end piece 2, its function in either position being the same.

The purpose of my invention should be readily apparent to all conversant with eyeglass fitting by reference to the accompanying drawings and it will be understood that the sleeve 6 being adjustable on the arm 5 permits of movement of the ear hook relative to the temple and in this manner ear hooks may be accommodated to ears of different heights or to cases where the ear hooks need to be raised relative to the trial frame to insure correct fitting of the frame on the face.

I find it desirable in the use of my invention to provide some means for locking or holding the sleeve and ear hook in adjusted position relative to the temple section. In Fig. IV I have shown this adjustment as secured by means of a thumb screw threaded through the sleeve and adapted to clampingly engage the arm 5, said thumb screw 8 having the inner end thereof burred to prevent accidental withdrawal thereof from the sleeve.

In Figs. V and VI in place of employing the thumb screw I have secured to the arm 5 the spring strip 9 having the bosses 10 formed thereon for engagement in the aperture 11 formed in the sleeve, the resiliency of the strip 9 forcing the bosses outward to engage the aperture in the sleeve while permitting of manual sliding of the sleeve as desired.

In Fig. VIII I have shown a still further modification of locking means in which I employ a spring pressed catch or bolt 12 which may either clampingly engage the arm 5 or may fit into any one of a plurality of apertures formed in said arm to receive the end of the pin as is clearly shown in the drawings.

From the foregoing description the construction and use of my improved temple for trial frames or spectacles should be readily apparent, and it will be seen that I have provided a simple, durable, efficient and readily adjustable temple in which the ear hook portion is adjustable relative to the temple side and which will consequently permit of the more correct fitting of the lenses relative to the eye of the wearer and which will also permit of the easy accommodation of the ear hooks to the ears of a person when said ears are disposed at different heights on the head or when the patient is suffering from any other malformation.

I claim:

1. The combination with a temple side having an angular portion at one end thereof, of an ear hook having an angular portion adjustably engaging the angular portion of the side.

2. The combination with a temple side having an angular portion at one end thereof, of an ear hook having an angular portion slidably mounted on the angular portion of the side, and a clamp for securing the parts in relatively adjusted position.

3. The combination with a temple side, of an ear hook slidably supported thereby for vertical adjustment relative thereto.

4. The combination with a temple side, of an ear hook vertically adjustable relative thereto, and means for securing the parts in desired adjusted position.

5. The combination with a side section, of an angular arm carried thereby, an ear hook adjustably mounted on said arm and means for securing the ear hook in adjusted position on the arm.

In testimony wherof I affix my signature in presence of two witnesses.

GEORGE L. TULLY.

Witnesses:
FLORENCE ST. MARTIN,
MAY L. STEBBINS.

---

Copies of this patent may be obtained for five cents each, by addressing the "Commissioner of Patents, Washington, D. C."